(12) United States Patent
Prabhakar et al.

(10) Patent No.: US 8,776,069 B2
(45) Date of Patent: Jul. 8, 2014

(54) ENERGY AND PERFORMANCE OPTIMIZING JOB SCHEDULING

(75) Inventors: Giridhar M. Prabhakar, Bangalore (IN); Chiranjib Sur, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 317 days.

(21) Appl. No.: 12/961,633

(22) Filed: Dec. 7, 2010

(65) Prior Publication Data

US 2012/0144394 A1     Jun. 7, 2012

(51) Int. Cl.
*G06F 9/46*          (2006.01)

(52) U.S. Cl.
USPC ............ 718/102; 718/100; 718/103; 718/104

(58) Field of Classification Search
None
See application file for complete search history.

(56) References Cited

U.S. PATENT DOCUMENTS

| | | | |
|---|---|---|---|
| 2005/0216775 A1 | 9/2005 | Inoue | |
| 2006/0143483 A1* | 6/2006 | Liebenow | 713/300 |
| 2009/0064164 A1* | 3/2009 | Bose et al. | 718/105 |

OTHER PUBLICATIONS

Kim et al. Power Aware Scheduling of Bag-of-Tasks Applications with Deadline Constraints on DVS-enabled Clusters. [online] (2007). pp. 1-8. Retrieved From the Internet <http://www.cloudbus.org/~raj/papers/power-aware-scheduling-ccgrid07.pdf>.*

Yang, Jun, et al.; Dynamic Thermal Management Through Task Scheduling; abstract; ISPASS 2008; IEEE International Symposium on Performance Analysis of Systems and Software, 2008; IEEE.

Wang, Lizhe et al.; Towards Thermal Aware Workload Scheduling in a Data Center; Proceedings of the 2009, 10$^{th}$ International Symposium On Pervasive Systems, Algorithms, and Networks (ISPAN 2009); IEEE.

* cited by examiner

*Primary Examiner* — Emerson Puente
*Assistant Examiner* — Jonathan R Labud
(74) *Attorney, Agent, or Firm* — Edward J. Lenart; Katherine S. Brown; Biggers Kennedy Lenart Spraggins LLP

(57) ABSTRACT

Energy and performance optimizing job scheduling that includes queuing jobs; characterizing jobs as hot or cold, specifying a hot and a cold job sub-queue; iteratively for a number of schedules, until estimated performance and power characteristics of executing jobs in accordance with a schedule meets predefined selection criteria: determining a schedule in dependence upon a user provided parameter, the characterization of each job as hot or cold, and an energy and performance optimizing heuristic; estimating performance and power characteristics of executing the jobs in accordance with the schedule; and determining whether the estimated performance and power characteristics meet the predefined selection criteria. If the estimated performance and power characteristics do not meet the predefined selection criteria, adjusting the user-provided parameter for a next iteration and executing the plurality of jobs in accordance with the determined schedule if the estimated performance and power characteristics meet the predefined selection criteria.

9 Claims, 2 Drawing Sheets

ENERGY AND PERFORMANCE OPTIMIZING JOB SCHEDULING

BACKGROUND OF THE INVENTION

1. Field of the Invention

The field of the invention is data processing, or, more specifically, methods, apparatus, and products for energy and performance optimizing job scheduling.

2. Description of Related Art

Electricity costs for powering and cooling the computing infrastructure in data centers is increasing. The environmental impact of such powering and cooling is also increasing. In today's computing environments, a set of jobs (also called tasks) are often scheduled in one of two ways: to increase computational efficiency of processing the set of jobs or to decrease power consumption in processing the set of tasks. To date, however, no job scheduling is carried out that takes into account both computational efficiency and power consumption of a set of jobs.

SUMMARY OF THE INVENTION

Methods, apparatus, and products for energy and performance optimizing job scheduling in a data processing system are disclosed. In accordance with embodiments of the present invention, energy and performance optimizing job scheduling includes queuing a plurality of jobs; characterizing each of the plurality of jobs as one of hot or cold, thereby specifying a hot job sub-queue and a cold job sub-queue; iteratively for a plurality of schedules of the plurality of jobs, until estimated performance and power characteristics of executing jobs in accordance with a schedule meets predefined selection criteria: determining a schedule for the plurality of jobs in dependence upon a user provided parameter, the characterization of each job as hot or cold, and an energy and performance optimizing heuristic; estimating performance and power characteristics of executing the jobs in accordance with the schedule; and determining whether the estimated performance and power characteristics meet the predefined selection criteria; if the estimated performance and power characteristics do not meet the predefined selection criteria, adjusting the user-provided parameter; and if the estimated performance and power characteristics meet the predefined selection criteria, executing the plurality of jobs in accordance with the schedule.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
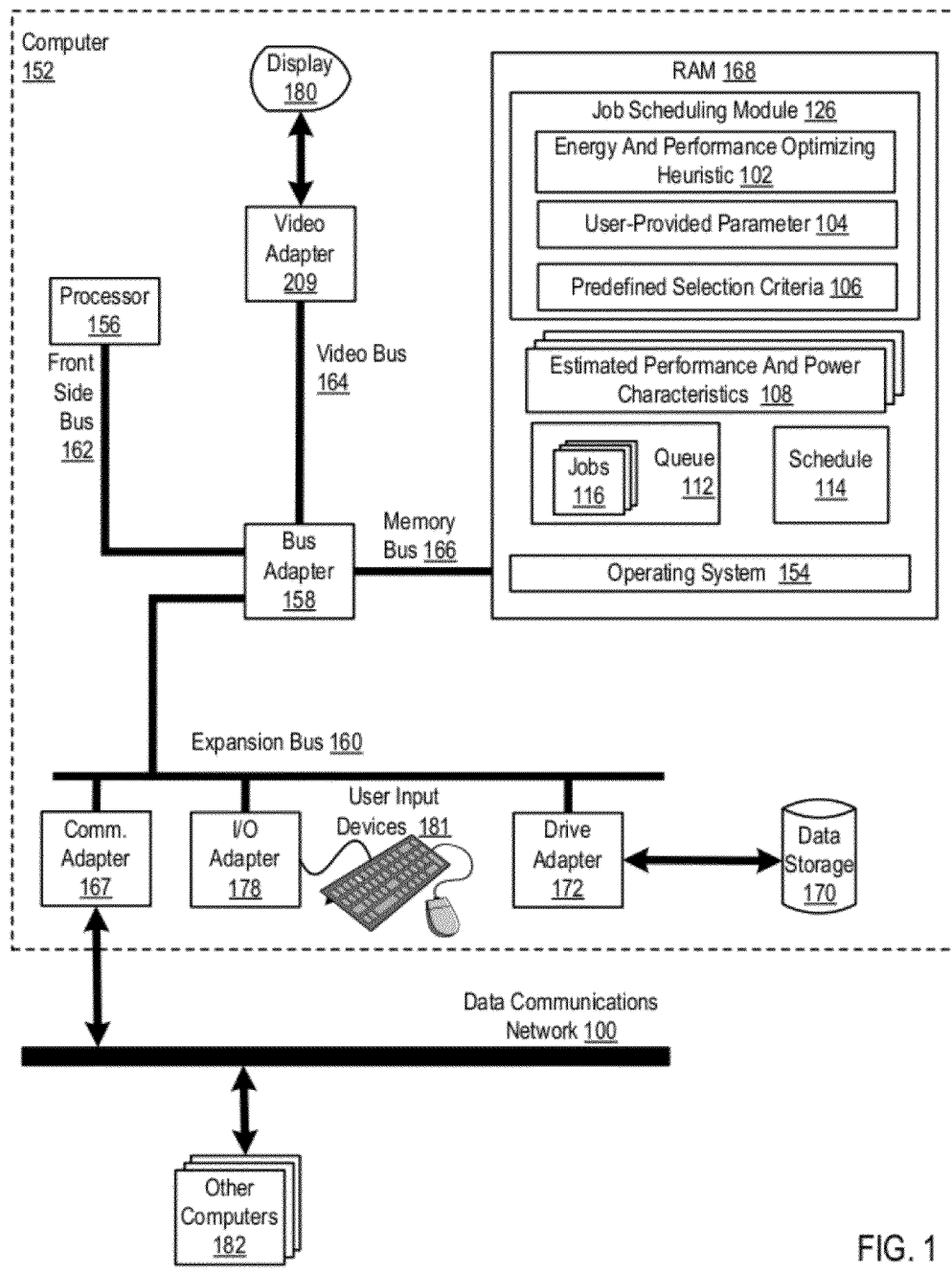
FIG. 1 sets forth a network diagram of a data processing system for energy and performance optimizing job scheduling according to embodiments of the present invention.

Exemplary methods, apparatus, and products for energy and performance optimizing job scheduling in accordance with the present invention are described with reference to the accompanying drawings, beginning with FIG. 1. FIG. 1 sets forth a network diagram of a data processing system for energy and performance optimizing job scheduling according to embodiments of the present invention. A 'job' as the term is used here may refer to any process that is to be executed (carried out) in a data processing system, where the execution of the job may increase temperature of the data processing system or increase power consumption of the data processing system. A job, for example, may be a thread of execution to be scheduled by an operating system and executed by a computer processor, a query of database, an input/output request, data communications to be processed, a memory read or write, or other task carried out in a data processing system. A schedule as the term is used here is a specification of an order of execution of more than one job.

The data processing system of FIG. 1 is implemented with automated computing machinery—a computer (152)—that includes at least one computer processor (156) or 'CPU' as well as random access memory (168) ('RAM') which is connected through a high speed memory bus (166) and bus adapter (158) to processor (156) and to other components of the computer (152). Although the data processing system in the example of FIG. 1 is depicted as a single computer (152) with a single CPU, readers of skill in the art will recognize that energy and performance optimizing job scheduling may be carried out in other forms of data processing systems: massively parallel super-computers, data centers, a computer with a multi-processor or co-processor, and so on as will occur to readers of skill in the art.

Stored in RAM (168) is a job scheduling module (126), a module of computer program instructions for scheduling jobs in an energy and performance optimizing manner. The job scheduling module (126) of FIG. 1 may schedule jobs in an energy and performance optimizing manner in accordance with embodiments of the present invention by first receiving and queuing (112) a plurality of jobs (116). The job scheduling module (126) may then characterize each of the jobs (116) as one of hot or cold, thereby specifying a hot job sub-queue and a cold job sub-queue. The job scheduling module (126) may characterize each of the jobs (116) as hot or cold in ways known to those of skill in the art. For example, each job may have a type—a write to memory, a read to memory, and so on, and each type of job may, in a thermal job profile, be associated with a characterization. As another example, a job may have been previously executed in the data processing system and data describing the power consumption or ambient temperature of the data processing system during execution of the job may have been recorded, indicating whether the job is 'hot' or 'cold' relative to a predetermined threshold.

The example job scheduling module (126) of FIG. 1 may then, iteratively for a number of schedules (114) of the jobs, until estimated performance and power characteristics of executing jobs in accordance with a schedule (114) meets predefined selection criteria (106): determine a schedule (114) for the plurality of jobs in dependence upon a user provided parameter (104), the characterization of each job as hot or cold, and an energy and performance optimizing heuristic (102); estimate performance and power characteristics (108) of executing the jobs (116) in accordance with the schedule (114); and determine whether the estimated performance and power characteristics (108) meet the predefined selection criteria (106). If the estimated performance and power characteristics (108) do not meet the predefined selection criteria (106), the job scheduling module (126) may adjust the user-provided parameter (104) and proceed to the next iteration. If the estimated performance and power characteristics (108) meet the predefined selection criteria (106), the job scheduling module (126) may then execute the jobs (116) in accordance with the schedule (114).

Performance characteristics may be any description of execution performance of a particular schedule—time to complete the enter set of jobs when executed in accordance with the particular schedule, average time of execution per job when executed in accordance with the particular schedule, and so on as will occur to readers of skill in the art.

Power characteristics may be any representation of energy consumption related to executing a particular schedule of jobs—average temperature of one or more elements of data processing system (e.g. CPU temperature) during execution of each job, peak temperature of one or more elements of the data processing system during execution of the jobs in accordance with the particular schedule, average power consumed per task, total power consumed in executing the jobs in accordance with the schedule, and so on as will occur to readers of skill in the art.

The term 'predefined selection criteria' as used in this specification refers to a specification of acceptable power and performance characteristics of a schedule. Predefined selection criteria may be specified in various ways, including for example, as a range of acceptable power characteristics in association with a range of acceptable performance characteristics, as a predefined threshold of power and performance characteristics, as a computer function that, when executed provides a Boolean result (e.g. 'True' or 'False'), and so on as will occur to readers of skill in the art.

A heuristic as the term is used here refers to a schedule selection algorithm that operates at least partially in dependence upon a user-provided value. The term 'heuristic' generally, outside of the scope of this specification, refers to experience-based techniques for problem solving, learning, and discovery. Heuristic methods are used to come to an optimal solution as rapidly as possible. Part of this method is using a "rule of thumb," an educated guess, an intuitive judgment, or common sense. The 'user-provided value' of the present specification is type of 'educated guess' of sorts—a starting point from which the schedule selection algorithm may determine or identify an optimal (or semi-optimal) schedule.

Also stored in RAM (168) is an operating system (154). Operating systems useful energy and performance optimizing job scheduling according to embodiments of the present invention include UNIX™, Linux™, Microsoft XP™, AIX™, IBM's i5/OS™, and others as will occur to those of skill in the art. The operating system (154) and job scheduling module (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for energy and performance optimizing job scheduling according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for energy and performance optimizing job scheduling according to embodiments of the present invention include modems for wired dial-up communications, Ethernet (IEEE 802.3) adapters for wired data communications network communications, and 802.11 adapters for wireless data communications network communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
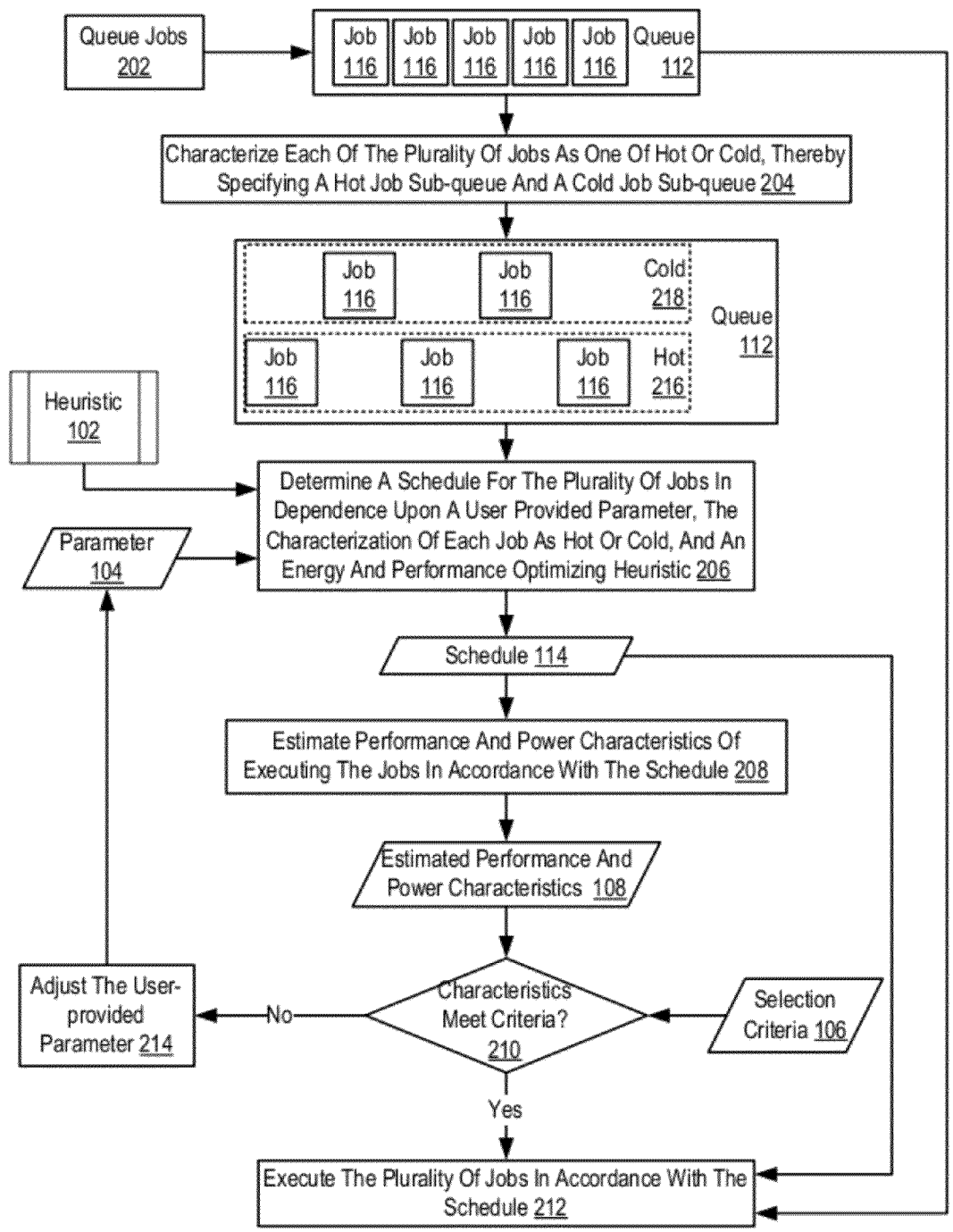
FIG. 2 sets forth a flow chart illustrating a further exemplary method for energy and performance optimizing job scheduling according to embodiments of the present invention.

For further explanation, FIG. 2 sets forth a flow chart illustrating a further exemplary method for energy and performance optimizing job scheduling according to embodiments of the present invention. The method of FIG. 2 includes queuing (202) a plurality of jobs (116) and characterizing (204) each of the plurality of jobs (116) as one of hot or cold, thereby specifying a hot job sub-queue (216) and a cold job sub-queue (218). Queuing (202) a plurality of jobs (116) may be carried out in various ways including, for example, by inserting a description of each job into a list of jobs. Characterizing (204) each of the plurality of jobs (116) as one of hot or cold, thereby specifying a hot job sub-queue (216) and a cold job sub-queue (218) may be carried out in various ways, including for example, by job type in accordance with a predefined thermal profile of job types.

The method of FIG. 2 also includes a portion carried out iteratively for a plurality of schedules (114) of the plurality of jobs (116), until estimated performance and power characteristics (108) of executing jobs in accordance with a schedule meets predefined selection criteria (106). The iterative portion includes determining (206) a schedule (114) for the plurality of jobs (116) in dependence upon a user provided parameter (104), the characterization (204) of each job as hot or cold, and an energy and performance optimizing heuristic (102); estimating (208) performance and power characteristics (108) of executing the jobs (116) in accordance with the schedule (114); and determining (210) whether the estimated performance and power characteristics (108) meet the predefined selection criteria (106). If the estimated performance and power characteristics (108) do not meet the predefined selection criteria (106), adjusting (214) the user-provided parameter (214) for a next iteration; and if the estimated performance and power characteristics (108) meet the predefined selection criteria (106), executing (212) the plurality of jobs (116) in accordance with the determined schedule (114).

In the method of FIG. 2, determining (206) a schedule (114) for the plurality of jobs (116) in dependence upon a user provided parameter (104), the characterization (204) of each job as hot or cold, and an energy and performance optimizing heuristic (102) may be carried out in various ways. In one possible way determining a schedule may include: for each possible schedule of the plurality of jobs, calculating:

$$\omega = \lambda(\sigma_{cold} - \sigma^*_{cold}) + (1-\lambda)(\sigma_{hot} - \sigma^*_{hot}); \text{ and}$$

selecting the schedule having a minimum calculated $\omega$ value. In the above equation $\sigma_{cold}$ is the average stretch value for the cold job sub-queue of the possible schedule for which $\omega$ is calculated where the average stretch value represents the sum of times to complete execution of each job, in the possible schedule, preceding the final job in the cold job sub-queue including the time to complete execution of the final job in the cold job sub-queue, normalized by the time to complete execution of the final job in the cold job sub-queue. In similar manner, $\sigma_{hot}$ is the average stretch value for the hot job sub-queue of the possible schedule for which $\omega$ is calculated, the stretch value representing the sum of times to complete execution of each job, in the possible schedule, preceding the final job in the hot job sub-queue including the time to complete execution of the final job in the hot job sub-queue, normalized by the time to complete execution of the final job in the hot job sub-queue. In the example equation listed above, $\sigma^*_{cold}$ is the sum of the times to complete execution of each job in the cold job sub-queue, in the order of the schedule and ignoring hot jobs. Likewise, $\sigma^*_{hot}$ is the sum of the times to complete execution of each job in the hot job sub-queue, in the order of the schedule and ignoring cold jobs. In the example equation above, $\lambda$ is the user provided parameter (104).

The times to complete execution of jobs with regard to $\sigma_{cold}$, $\sigma_{hot}$, $\sigma^*_{cold}$, and $\sigma^*_{hot}$ may be calculated from estimations, from previously recorded data, and in other ways as will occur to readers of skill in the art.

When $\lambda$ is equal to $$\frac{p^2_{cold}}{p^2_{cold} + p^2_{hot}},$$

where $p_{cold}$ is the average power consumption of execution the cold job sub-queue and $p_{hot}$ is the average power consumption of executing the hot job sub-queue, the schedule selected by the heuristic is a shortest hottest job first schedule.

In another embodiment, when $\lambda$ is equal to $$\frac{p^2_{hot}}{p^2_{cold} + p^2_{hot}},$$

the schedule is a shortest coolest job first schedule. In this way, a user may selectively weigh a schedule to run cooler jobs first or hotter jobs first by careful selection of $\lambda$.

Determining (206) a schedule (114) for the plurality of jobs may be carried out in accordance with another heuristic in which, for each possible schedule of the plurality of jobs, determining (206) a schedule (114) include calculating:

$$\omega = \left| \sigma - (1+\alpha)\left[ \frac{\sigma^*_{cold}}{\alpha} + \sigma^*_{hot} \right] \right|; \text{ and}$$

selecting, as the schedule for executing the plurality jobs, the schedule having a minimum calculated $\omega$ value. In this example equation—this example heuristic—$\sigma$ is the sum of times to complete execution of the plurality of jobs in accordance with the schedule, $\sigma^*_{cold}$ is the sum of the times to execute each job in the cold job sub-queue in accordance with the schedule; $\sigma^*_{hot}$ is the sum of the times to execute each job in the hot job sub-queue in accordance with the schedule; and a is the user-provided value.

As described above, the plurality of jobs may be characterized as one of hot or cold. In another embodiment, however, energy and performance optimizing job scheduling in a data processing system in accordance with embodiments of the present invention may include categorizing each of the plurality of jobs into one or more sub-queues in dependence upon the jobs' power characteristics and in accordance with predefined categorization rules. That is, more than two sub-queues (hot or cold) may be employed, where each sub-queue is associated with an average power consumption of a set jobs or an average temperature associated with a set of jobs. Categorization rules, as recited here, specify ranges of power consumption or temperature for each sub-queue. In this way, energy and performance optimizing job scheduling in accordance with embodiments of the present invention may be controlled in a fine-grain manner.

In view of the explanations set forth above, readers will recognize that the benefits of energy and performance optimizing job scheduling according to embodiments of the present invention include:

Selecting a job schedule that provides optimal energy and performance characteristics in an efficient, optimal manner;

Providing a user some control over job schedule selection with user selectable weighting parameters; and Other benefits as will occur to readers of skill in the art.

Exemplary embodiments of the present invention are described largely in the context of a fully functional computer system for energy and performance optimizing job scheduling. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for energy and performance optimizing job scheduling, the apparatus comprising a computer processor, a computer memory operatively coupled to the computer processor, the computer memory having disposed within it computer program instructions capable of:

queuing a plurality of jobs;

characterizing each of the plurality of jobs as one of hot or cold, thereby specifying a hot job sub-queue and a cold job sub-queue;

iteratively for a plurality of schedules of the plurality of jobs, until estimated performance and power characteristics of executing jobs in accordance with a schedule meets predefined selection criteria:

determining a schedule for the plurality of jobs in dependence upon a user provided parameter, the characterization of each job as hot or cold, and an energy and performance optimizing heuristic;

estimating performance and power characteristics of executing the jobs in accordance with the schedule; and determining whether the estimated performance and power characteristics meet the predefined selection criteria;

if the estimated performance and power characteristics do not meet the predefined selection criteria, adjusting the user-provided parameter for a next iteration; and if the estimated performance and power characteristics meet the predefined selection criteria, executing the plurality of jobs in accordance with the determined schedule, wherein determining a schedule for the plurality of jobs in dependence upon a user provided parameter, the characterization of each job as hot or cold, and an energy and performance optimizing heuristic further comprises:

for each possible schedule of the plurality of jobs, calculating:

$$\omega = \lambda(\sigma_{cold} - \sigma^*_{cold}) + (1-\lambda)(\sigma^*_{hot} - \sigma^*_{hot}); \text{ and}$$

selecting the schedule having a minimum calculated $\omega$ value, wherein:

$\sigma_{cold}$ comprises the average stretch value for the cold job sub-queue of the possible schedule for which $\omega$ is calculated, the average stretch value representing the sum of times to complete execution of each job, in the possible schedule, preceding the final job in the cold job sub-queue including the time to complete execution of the final job in the cold job sub-queue, normalized by the time to complete execution of the final job in the cold job sub-queue;

$\sigma_{hot}$ comprises the average stretch value for the hot job sub-queue of the possible schedule for which $\omega$ is calculated, the stretch value representing the sum of times to complete execution of each job, in the possible schedule, preceding the final job in the hot job sub-queue including the time to complete execution of the final job in the hot job sub-queue, normalized by the time to complete execution of the final job in the hot job sub-queue;

$\sigma^*_{cold}$ comprises the sum of the times to complete execution of each job in the cold job sub-queue;

$\sigma^*_{hot}$ comprises the sum of the times to complete execution of each job in the hot job sub-queue; and $\lambda$ comprises the user provided parameter.

2. The apparatus of claim 1 wherein:

$\lambda$ comprises $$\frac{p^2_{cold}}{p^2_{cold} + p^2_{hot}},$$

and the schedule comprises a shortest hottest job first schedule, wherein $p_{cold}$ comprises the average power consumption of execution the cold job sub-queue; and $p_{hot}$ comprises the average power consumption of executing the hot job sub-queue.

3. The apparatus of claim 1 wherein:

$\lambda$ comprises $$\frac{p^2_{hot}}{p^2_{cold} + p^2_{hot}},$$

and the schedule comprises a shortest coolest job first schedule, wherein $p_{cold}$ comprises the average power consumption of execution the cold job sub-queue; and $p_{hot}$ comprises the average power consumption of executing the hot job sub-queue.

4. The apparatus of claim 1 wherein determining a schedule for the plurality of jobs in dependence upon a user provided parameter, the characterization of each job as hot or cold, and an energy and performance optimizing heuristic further comprises:

for each possible schedule of the plurality of jobs, calculating:

$$\omega = \left| \sigma - (1+\alpha)\left[\frac{\sigma^*_{cold}}{\alpha} + \sigma^*_{hot}\right] \right|;$$

and selecting, as the schedule for executing the plurality jobs, the schedule having a minimum calculated $\omega$ value, wherein:

$\sigma$ a comprises the sum of times to complete execution of the plurality of jobs in accordance with the schedule;

$\sigma^*_{cold}$ comprises the sum of the times to execute each job in the cold job sub-queue in accordance with the schedule;

$\sigma^*_{hot}$ hot comprises the sum of the times to execute each job in the hot job sub-queue in accordance with the schedule; and $\alpha$ comprises the user-provided value.

5. A computer program product for energy and performance optimizing job scheduling, the computer program product disposed upon a computer readable medium, wherein the computer readable medium is not a signal and the computer program product comprises computer program instructions that, when executed, cause a computer to carry out the steps of:

queuing a plurality of jobs;

characterizing each of the plurality of jobs as one of hot or cold, thereby specifying a hot job sub-queue and a cold job sub-queue;

iteratively for a plurality of schedules of the plurality of jobs, until estimated performance and power characteristics of executing jobs in accordance with a schedule meets predefined selection criteria:

determining a schedule for the plurality of jobs in dependence upon a user provided parameter, the characterization of each job as hot or cold, and an energy and performance optimizing heuristic;

estimating performance and power characteristics of executing the jobs in accordance with the schedule; and determining whether the estimated performance and power characteristics meet the predefined selection criteria;

if the estimated performance and power characteristics do not meet the predefined selection criteria, adjusting the user-provided parameter for a next iteration; and if the estimated performance and power characteristics meet the predefined selection criteria, executing the plurality of jobs in accordance with the determined schedule, wherein determining a schedule for the plurality of jobs in dependence upon a user provided parameter, the characterization of each job as hot or cold, and an energy and performance optimizing heuristic further comprises:

for each possible schedule of the plurality of jobs, calculating:

$$\omega = \lambda(\sigma_{cold} - \sigma^*_{cold}) + (1-\lambda)(\sigma_{hot} - \sigma^*_{hot}); \text{ and}$$

selecting the schedule having a minimum calculated $\omega$ value, wherein:

$\sigma_{cold}$ comprises the average stretch value for the cold job sub-queue of the possible schedule for which $\omega$ is calculated, the average stretch value representing the sum of times to complete execution of each job, in the possible schedule, preceding the final job in the cold job sub-queue including the time to complete execution of the final job in the cold job sub-queue, normalized by the time to complete execution of the final job in the cold job sub-queue;

$\sigma_{hot}$ comprises the average stretch value for the hot job sub-queue of the possible schedule for which $\omega$ is calculated, the stretch value representing the sum of times to complete execution of each job, in the possible schedule, preceding the final job in the hot job sub-queue including the time to complete execution of the final job in the hot job sub-queue, normalized by the time to complete execution of the final job in the hot job sub-queue;

$\sigma^*_{cold}$ comprises the sum of the times to complete execution of each job in the cold job sub-queue;

$\sigma^*_{hot}$ comprises the sum of the times to complete execution of each job in the hot job sub-queue; and $\lambda$ comprises the user provided parameter.

6. The computer program product of claim 5 wherein:
$\lambda$ comprises $$\frac{p^2_{cold}}{p^2_{cold} + p^2_{hot}},$$

and the schedule comprises a shortest hottest job first schedule, wherein $p_{cold}$ comprises the average power consumption of execution the cold job sub-queue; and $p_{hot}$ comprises the average power consumption of executing the hot job sub-queue.

7. The computer program product of claim 5 wherein:
$\lambda$ comprises $$\frac{p^2_{hot}}{p^2_{cold} + p^2_{hot}},$$

and the schedule comprises a shortest coolest job first schedule, wherein $p_{cold}$ comprises the average power consumption of execution the cold job sub-queue; and $p_{hot}$ comprises the average power consumption of executing the hot job sub-queue.

8. The computer program product of claim 5 wherein determining a schedule for the plurality of jobs in dependence upon a user provided parameter, the characterization of each job as hot or cold, and an energy and performance optimizing heuristic further comprises:

for each possible schedule of the plurality of jobs, calculating:

$$\omega = \left| \sigma - (1+\alpha) \left[ \frac{\sigma^*_{cold}}{\alpha} + \sigma^*_{hot} \right] \right|;$$

and selecting, as the schedule for executing the plurality jobs, the schedule having a minimum calculated $\omega$ value, wherein:

$\sigma$ comprises the sum of times to complete execution of the plurality of jobs in accordance with the schedule;

$\sigma^*_{cold}$ comprises the sum of the times to execute each job in the cold job sub-queue in accordance with the schedule;

$\sigma^*_{hot}$ comprises the sum of the times to execute each job in the hot job sub-queue in accordance with the schedule; and $\alpha$ comprises the user-provided value.

9. The computer program product of claim 5 wherein the computer readable medium comprises a storage medium.

* * * * *